US007181333B2

(12) United States Patent
Sheikh et al.

(10) Patent No.: US 7,181,333 B2
(45) Date of Patent: Feb. 20, 2007

(54) ENGINE OPERATION WITHOUT CAM SENSOR

(75) Inventors: Ahmed Esa Sheikh, Erie, PA (US); Bo Nilson Almstedt, Amal (SE); Mikael Thorell, Amal (SE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/426,753

(22) Filed: Jun. 27, 2006

(65) Prior Publication Data

US 2006/0259226 A1 Nov. 16, 2006

Related U.S. Application Data

(62) Division of application No. 10/881,080, filed on Jun. 30, 2004, now Pat. No. 7,069,140.

(51) Int. Cl.
*G01M 15/04* (2006.01)
*F02B 69/06* (2006.01)

(52) U.S. Cl. ...................... 701/105; 701/103; 701/113; 123/21; 73/116

(58) Field of Classification Search ................ 701/103, 701/105, 111, 113, 114, 115; 123/21, DIG. 7; 73/116
See application file for complete search history.

(56) References Cited

U.S. PATENT DOCUMENTS 5,604,304 A * 2/1997 Kokubo et al. ............ 73/117.3

* cited by examiner

*Primary Examiner*—Willis R. Wolfe, Jr.
*Assistant Examiner*—Johnny H. Hoang
(74) *Attorney, Agent, or Firm*—Carlos L. Hanze; Timothy H. Van Dyke; Beusse Wolter Sanks Mora & Maire

(57) ABSTRACT

Disclosed herein are methods of cranking and/or operating an engine that eliminates the need for use of a cam sensor. The methods implemented with internal combustion engine comprising a plurality of cylinders whose firing sequence occurs over two revolutions of a crankshaft with a first set of cylinders comprising a power stroke during the first crankshaft revolution and a second set of cylinders comprising the power stroke of a second crankshaft revolution. The methods involve manipulating fuel injection command signals to occur out of their proper sequence, monitoring and engine indicator responsive to firing and non-firing of cylinders, and identifying correct engine phase based on fluctuations in the engine indicator. Also disclosed herein are software product embodiments comprising program code modules that cause a engine control unit to manipulate the generation of fuel injection command signals to take place outside their correct sequence.

15 Claims, 15 Drawing Sheets

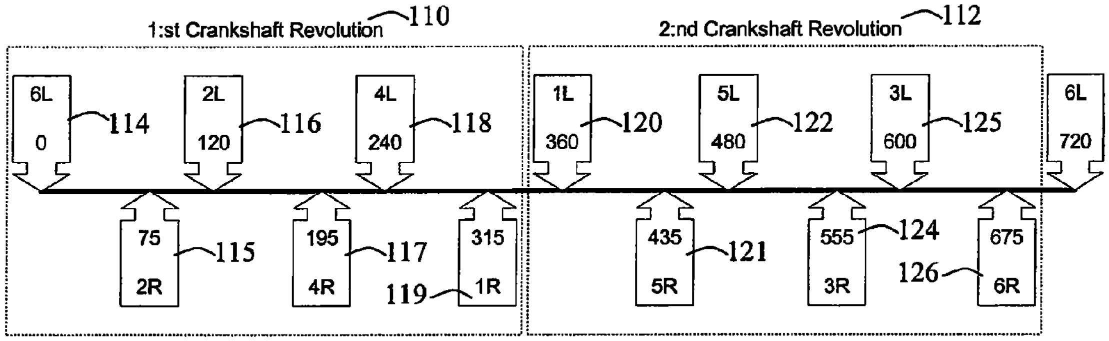
FIG. 3
| CRANK REV 1 (110) | | | | | | CRANK REV 2 (112) | | | | | | |
|---|---|---|---|---|---|---|---|---|---|---|---|---|
| 6L | 2R | 2L | 4R | 4L | 1R | 1L | 5R | 5L | 3R | 3L | 6R | 220 |
| 1L | 5R | 5L | 3R | 3L | 6R | 6L | 2R | 2L | 4R | 4L | 1R | 222 |
FIG. 4
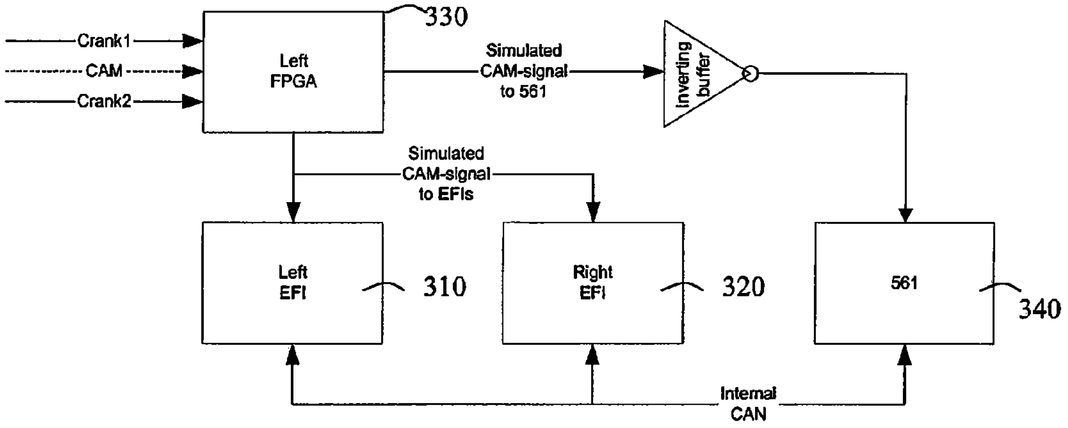
300
FIG. 5

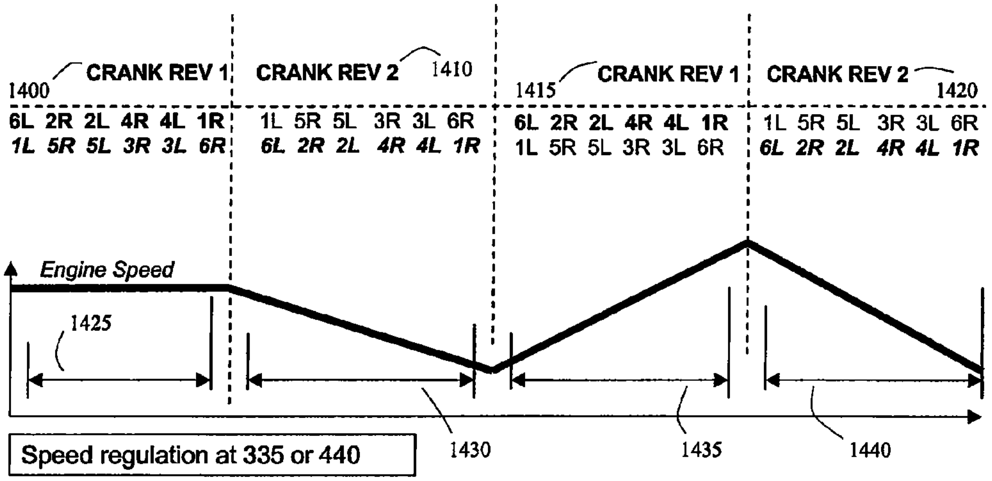

FIG. 14

| Name | Description | Valid data |
|---|---|---|
| CamMode | This bit is controlling if the EFIs if are using emulated CAM signal or a real sensor signal. This is for backwards compatability. | 0 = CAM sensor<br>1 = Emulated CAM signal |
| FirstRevLeft | Bit that specify what crank revolution the left EFI should consider as the first one (0-360 °). | 0 = Even<br>1 = Odd |
| FirstRevRight | Bit that specify what crank revolution the right EFI should consider as the first one (0-360 °). | 0 = Even<br>1 = Odd |
| StrokeModeLeft | Bit that specifies what stroke mode the left EFI should use. | 0 = 4-stroke<br>1 = semi2-stroke<br>2 = 2-stroke<br>3 = 4-stroke |
| StrokeModeRight | Bit that specifies what stroke mode the right EFI should use. | 0 = 4-stroke<br>1 = semi2-stroke<br>2 = 2-stroke<br>3 = 4-stroke |

FIG. 15

| Name | Description | Valid data |
|---|---|---|
| CamMode | Status bit indicating if the EFI is using emulated CAM signal or a real sensor signal. This is for backwards compatability | 0 = CAM sensor<br>1 = Emulated CAM signal |
| FirstRev | Status bit that specify what crank revolution the EFI is using as the first one (0-360 °). | 0 = Even<br>1 = Odd |
| StrokeMode | Status bits that specify what stroke mode the EFI is using. | 0 = 4-stroke<br>1 = semi 2-stroke<br>2 = 2-stroke |

FIG. 16

| Function call | Input parameters | Return data | Description |
|---|---|---|---|
| GetEngineSpeedOdd | None | float | Returns the average engine speed for the latest odd revolution. The engine speed is measured over 360 crankshaft degrees. |
| GetEngineSpeedEven | None | float | Returns the average engine speed for the latest even revolution. The engine speed is measured over 360 crankshaft degrees. |
| GetEngineRev | None | int | Returns the current engine revolution, odd or even<br>0=Even, 1= Odd |
| SetEfiSyncMode(efi, Mode, firstRev)<br>1700 | int efi<br>int strokeMode<br>int firstRev | void | Synchronisation command to EFIs.<br>efi: 0=Both EFIs, 1=Left EFI, 2= Right EFI<br>Mode: 0=Set 4-stroke mode, 1=Set Semi2-stroke mode, 2=Set Full 2-stroke mode<br>firstRev: 0= Set 1:st revolution to odd, 1=Set 1:st revolution to even |
| GetCamModeEfiLeft | None | Int | Return what CAM function is used on the left EFI<br>0 = CAM sensor<br>1 = Emulated CAM signal |
| GetCamModeEfiRight | None | Int | Return what CAM function is used on the right EFI<br>0 = CAM sensor<br>1 = Emulated CAM signal |
| GetCamOddEvenFirstRevEfiLeft | None | Int | Return what crank revolution the left EFI is using as the first one (0-360 degs).<br>0 = Even<br>1 = Odd |
| GetCamOddEvenFirstRevEfiRight | None | Int | Return what crank revolution the right EFI is using as the first one (0-360 degs).<br>0 = Even<br>1 = Odd |
| GetStrokeModeEfiLeft | None | Int | Returns what stroke mode the left EFI is using.<br>0 = 4-stroke<br>1 = semi 2-stroke<br>2 = 2-stroke |
| GetStrokeModeEfiRight | None | Int | Returns what stroke mode the right EFI is using.<br>0 = 4-stroke<br>1 = semi 2-stroke<br>2 = 2-stroke |

FIG. 17

| Source file name | Function | Description |
|---|---|---|
| a_CanApi.c | SetEfiSyncMode | Transmit commands to the EFIs over internal CAN-bus for the synchronisation mode. There are three input parameter, target EFI, Mode and first revolution.<br>The parameter target EFI defines the EFI the command is sent to, left, right or both EFIs.<br>The parameter Mode defines the injection mode the target EFI shall operate in, 4-stroke, Semi2-stroke or full 2-stroke<br>The parameter first revolution defines if the first revolution, 0-360 crankshaft degrees, shall be the odd or the even revolution. |
| s_CamHandler.c | GetEngineSpeedOdd | Returns the engine speed for the latest odd crankshaft revolution |
| | GetEngineSpeedEven | Returns the engine speed for the latest even crankshaft revolution |
| | GetEngineRev | Returns the current crankshaft revolution, odd or even |

FIG. 18

| Source file name | Function | Description |
|---|---|---|
| S_CamHandler.c | Phase720CamLevelActive | Returns if actual crank revolution is the second (360-720). |
| S_TimingDurCalc.c | CheckPumpFrame | Checks if new data is arrived in the pump frame.<br>Calls SetStrokeMode if current crank revolution is 360-720. |
| | SetStrokeMode | Reorders firing order and TDC data for cylinders.<br>Reinitialise TPU channels with new data. |
| | | |

FIG. 19

ENGINE OPERATION WITHOUT CAM SENSOR

RELATED APPLICATIONS

This application is a division of U.S. Ser. No. 10/881,080 filed Jun. 30, 2004, now U.S. Pat. No. 7,069,140 which is incorporated in its entirety by reference.

BACKGROUND OF THE INVENTION

In typical fuel injection engine systems, it is vital to know the position of each cylinder in order to properly time fuel injection. In conventional locomotive diesel engines, each cylinder performs a power stroke and an exhaust stroke. The crank wheel which is engaged to the crankshaft and responsive thereto performs two revolutions in completing a power stroke and an exhaust stroke for a given cylinder. The engine control process that governs fuel injection into a cylinder during a power stroke must obtain information from a camshaft (which performs one revolution for every two revolutions of the crankshaft) in order to properly determine whether a given cylinder is at its power stroke or exhaust stroke, i.e., in the first or second crank revolution. This type of operation is commonly called a four-stroke mode.

For some engines, the installation of a cam sensor is difficult and presents quality control issues during assembly. The performance of the cam sensor is related to its placement in the engine. Space constraints influence the positioning of the cam sensor and result in cam sensors being located at areas of excessive acceleration. It is generally recognized in the field of engine manufacturing and assembly that utilizing the least number of parts possible to achieve a desired function increases reliability and reduces costs. If one could eliminate the cam sensor, one could also eliminate machining done on the cam sensor cover and timing wheel. A fuel injected engine capable of starting and running without the need of a cam signal is desired.

BRIEF DESCRIPTION OF THE DRAWINGS

FIG. 3 shows a diagram depicting the firing sequence of a typical V12 engine.

FIG. 4 shows a diagram illustrating the problem of determining engine phase without cam sensor signal.

FIG. 5 shows a diagram an engine controller unit comprising a series of different processors according to one embodiment of the subject invention.

FIG. 10*a* represents the scenario where the right processor is in phase. FIG. 10*b* represents the scenario where the left processor is in phase.

FIG. 11*a* represents the scenario of the left processor being in phase. FIG. 11*b* shows the scenario of the left processor being out of phase.

FIG. 12*a* represents the scenario where the left processor is in phase. FIG. 12*b* represents the scenario where the right processor is in phase.

FIG. 14 shows a diagram demonstrating the determination of engine phase according to the manipulation embodiment shown in FIG. 13 and monitoring engine speed.

FIG. 15 is a table commands that may be implemented for communications from a master processor to a left and right processors according to one embodiment of the subject invention.

FIG. 16 is a table commands that may be implemented for communications from left and right processors to a master processor according to one embodiment of the subject invention.

FIG. 17 is a table of functions utilizing the commands shown in FIGS. 15 and 16.

FIG. 18 is a table representing files and function in the master processor according to one embodiment of the subject invention.

FIG. 19 is a table representing files and functions in the left and right processors according to one embodiment of the subject invention.

FIG. 22*a* shows a graph of one embodiment that utilizes the average of engine speed at the beginning and at the end of a revolution. FIG. 22*b* shows a graph of one embodiment that utilizes engine speed at one point in time at the end of each revolution.

DESCRIPTION OF THE INVENTION

For engines that operate by fuel injection, the archetypal configuration comprises a processor that controls injection of a bank of cylinders. For example, in a V12 cylinder engine, typically, one processor will control the injection of a bank of six cylinders and another processor will control the injection of the other bank of six cylinders. The proper timing of injection for each cylinder is based upon the position of the crankshaft to which the cylinders are operationally coupled. The position of the crankshaft is constantly monitored by at least one crank positioning sensor and the signal information produced by the crank positioning sensor is used to determine where in the 360° revolution the crankshaft is located. In the V12 example, all twelve cylinders fire during the course of two revolutions of the crankshaft. Thus, for example, one cylinder performs a power stroke during the first revolution of the crankshaft and an exhaust stroke during the second revolution of the crankshaft. However, without obtaining a cam sensor signal to determine whether the crank is in the first or second revolution, another mechanism for determining crankshaft revolution must be implemented.

In one aspect of the subject invention, the inventors have devised a method of determining the phase of an engine upon start up that does not require use of a cam sensor signal. The method involves altering the basic command sequence controlled by the processor and monitoring engine indicators for a predetermined period of time. Typically, the engine indicator is engine speed, but may also be determined by engine acceleration, exhaust temperature, mean fuel value, or any other variable that might be responsive to firing or non-firing of cylinders over a period of time.

Figure 1:
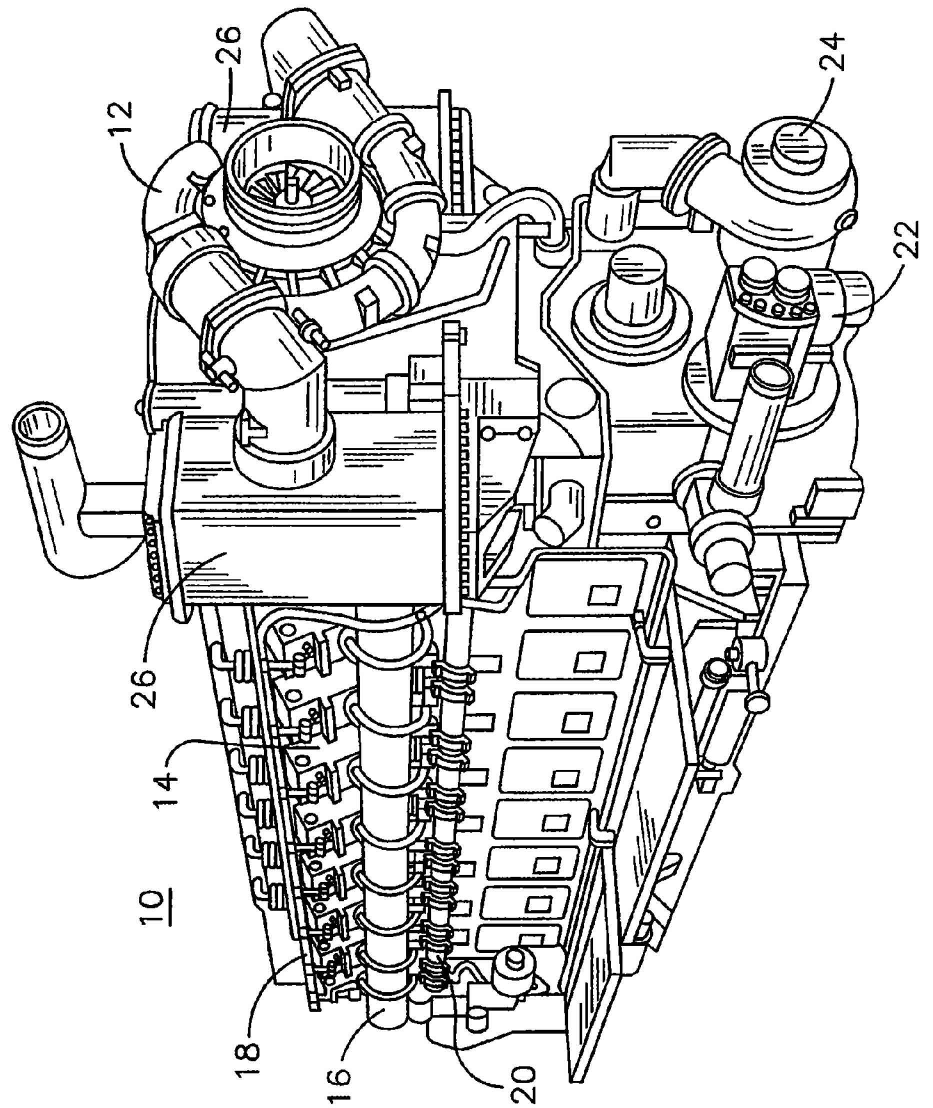
FIG. 1 shows a perspective view of V12 cylinder engine which may be controlled according to the principles of the subject invention.

FIG. 1 generally depicts an exemplary compression ignition diesel engine 10 which employs an electronic fuel control system for utilization in accordance with one embodiment of the invention. The engine 10 may be any relatively large diesel engine, such as diesel engine models FDL-12, FDL-16, or HDL, as manufactured by General Electric Company, at Grove City, Pa. Such an engine may include a turbo charger 12 and a series of unitized power or fuel injection assemblies 14. For example, a 12-cylinder engine has 12 such power assemblies while a 16 cylinder engine has 16 such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a V-style type or an in line type, also as known in the art.

Figure 2:
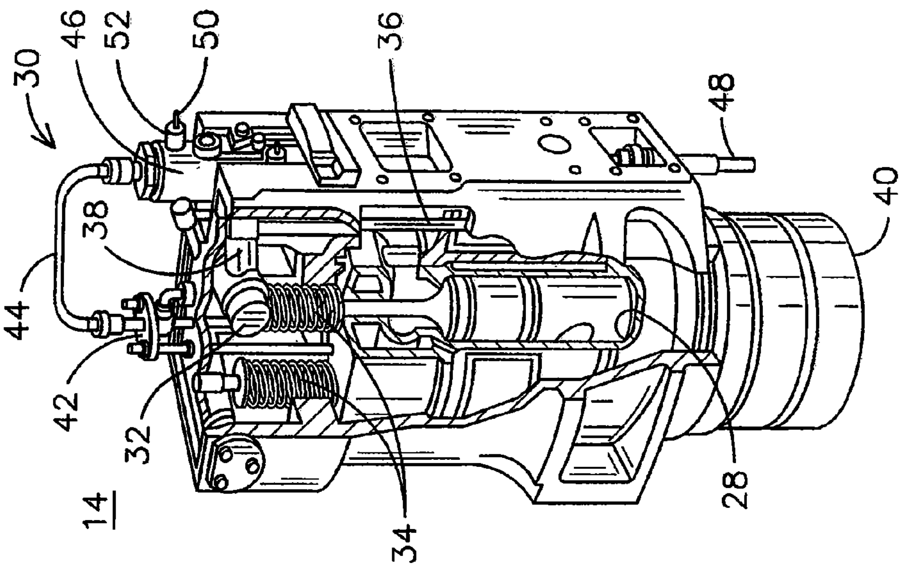
FIG. 2 shows a perspective view of a conventional fuel injection system that may be used in conjunction with embodiments of the subject invention.

FIG. 2 depicts one of the plurality of power assemblies 14 which includes a cylinder 28 and a corresponding fuel delivery assembly generally indicated at 30 for delivering fuel to the combustion chamber within the cylinder 28. Each unitized power assembly 14 may further include an air valve rocker arm shaft 32 for moving a plurality of spring-biased air valves generally indicated at 34. The valve rocker arm shaft 32 is connected to the valve pushrod 36 through the valve rocker arm 38, and is actuated as known in the art.

Each unitized power assembly 14 further includes a cylinder liner 40 which is insertable into a bored aperture (not shown) in the engine block of the engine 10. The unitized power assembly 14 includes a cylinder jacket or casting for housing the cylinder 28 and associated components. For a typical engine 10, such as may be used in locomotive applications, an exemplary range of injection pressure is between approximately 5–30 k.p.s.i, but may be a wider range depending on the engine. An exemplary fuel delivery flow volume range is between about 50–2600 $mm^3$/stroke. An exemplary range of per cylinder displacement may be from about 1 liters to about 15 liters, or higher, depending on the engine. It will be appreciated that the present invention is not limited to the above-described exemplary ranges.

The fuel delivery assembly 30 includes a fuel injecting mechanism 42 connected to a high-pressure injection line 44 which fluidly connects to a fuel pressure generating unit 46 such as a fuel pump. This configuration is known as a pump-line-nozzle configuration. The fuel pressure generating unit 46 builds pressure through the actuation of fuel pushrod 48 which is actuated by a lobe on the engine camshaft dedicated to fuel delivery actuation. The fuel delivery assembly 30 includes an electronic signal line 50 for receiving electronic signals from an electronic controller, as will be described later. The electronic signal line 50 provides a control signal to an electronically-controlled valve 52, such as a solenoid, which forms part of the fuel delivery assembly 30.

Turning to FIG. 3, the typical firing sequence of a V12 engine is shown. During the first crankshaft revolution 110, cylinders 6L 114, 2R 115, 2L 116, 4R 117, 4L 118, and 1R 119 all fire in that sequence. During the second crankshaft revolution, shown as 112, cylinders 1L 120, 5R 121, 5L 122, 3R 124, 3L 125, and 6R 126 fire in that sequence, respectively. As shown in FIG. 4, the cylinders shown in the top row 220 of the first crankshaft revolution 110 are performing the power stroke; conversely, during the first crankshaft revolution 110 the cylinders shown in bottom row 222 of the first crankshaft revolution 12 are performing an exhaust stroke. Such engines may utilize at least one processor to control the timing of injection in each of the cylinders over the course of 720° (2 crank revolutions). Typically, the engine comprises an engine controller unit (ECU) that comprises one processor to control a left bank of cylinders and another processor to control a right bank of cylinders for V-type engines. Upon cranking the engine, the ECU must correctly identify the crankshaft revolution in order to deliver fuel to the cylinders in the proper filing sequence. The inventors have devised ways for the ECU to determine which revolution the crankshaft is in by manipulating the timing of firing and cylinder selection controlled by the processor.

The term "engine phase" as used herein refers to the proper firing sequence wherein fuel injection commands are sent to the individual cylinders at a time, based on mechanical constraints, that fuel will be injected into the cylinder and combustion will occur. Engine phase is relevant to engines that comprise a plurality of cylinders wherein the firing of all cylinders occurs over the course or two revolutions, 720° of a crankshaft. The terms "out of phase" as used herein refers to a condition where fuel-injection command signals for a cylinder are programmed to be sent on a crankshaft revolution opposite to the crankshaft revolution where the power stroke for that cylinder occurs. Typically, though not necessarily, out of phase relates to an offset that is shifted 360 degrees from an event's proper position.

FIG. 5 shows a basis schematic for an engine controller unit 300 for a typical V12 engine comprising a first engine control processor 310 which controls a left bank of six cylinders, and a second engine control processor 320 which controls injection into a right bank of six cylinders. The signal processor 330 comprises a processing module configured to generate a pulse at every revolution of the crankshaft. This pulse is referred to as the simulated cam signal 332.

The fuel delivery assembly 30 is configured to be responsive to any fuel injection command signal received through signal line 50 during a power stroke at TDC so as to supply fuel to each cylinder during an injection window, which is determined by the rise of the fuel cam lobe. For example, if the cam lobe profile is rising, then fuel pushrod 48 (FIG. 2) will be actuated to build fuel pressure and, in cooperation with the fuel injection command firing signal that actuates the solenoid valve 52, then delivery of fuel into the cylinder will occur through the high pressure line 44. Fuel delivery may occur in advance of the power stroke (i.e., during compression stroke) and continue on into the power stroke. For instance, fuel injection may start at 5 degrees before TDC and continue for 25 degrees after TDC. Accordingly, the fuel delivery assembly may be configured so as to be insensitive to any fuel injection command signal received outside the injection window so that no fuel is delivered to the cylinder outside the injection window. For example, if the cam lobe profile is no longer rising, then fuel pushrod 48 (FIG. 2) will not be actuated to deliver any fuel and, even the presence of the firing signal would not result in delivery of fuel into the cylinder since the fuel pushrod in this case would not have been actuated by the fuel cam lobe. Thus, this embodiment takes advantage of the above-described duel interrelationship for delivering fuel into the cylinders: 1) fuel pushrod actuation and 2) presence of fuel injection command signal. If either of the two actions does not occur, then fuel delivery does not occur. It will be appreciated that foregoing interrelationship comprises an electromechanical interrelationship built in one exemplary embodiment and need not be implemented via software code. The above-described mechanical relationship is exploited during the cranking or operation such that one or more solenoids in the fuel delivery assembly are actuated as if each cylinder TDC corresponds to the power stroke. This results in firing the cylinder if indeed the cylinder is at TDC of the power stroke. However, the fuel delivery assembly will not inject fuel if the cylinder is at TDC of the exhaust stroke since in this latter case a fuel pump cam would not be moving upwardly, and thus no fuel flow will develop and the cylinder would not be fired even in the presence of a firing signal. For the sake of convention used herein, solenoid activation that occurs not during the power stroke (e.g. during exhaust stroke) refers to the generation of a fuel injection command (or firing signal) that occurs out of phase from the injection window, or portion thereof. The particular configuration of how the fuel is injected into the cylinder is not critical. What is important is that injection (or firing signals) may be sent but no fuel and/or firing will occur unless the injection signal is sent at a particular injection window. The ability to send injection signals without injection into the cylinders occurring allows for certain manipulations of firing signals to elucidate the proper phase of the engine without the use of a cam sensor.

TABLE 1 illustrates the crankshaft degree angle of each cylinder at its top dead center position or TDC and the correct phase and incorrect phase of each cylinder controlled by the left processor 310 or the right processor 320. During typical operation, the left processor 310 and the right processor 320 are in phase together, or same-phase, meaning that both processors accept the same revolutions as the first crankshaft revolution and second crankshaft revolution. If both processors assume the correct first and second revolutions (i.e., correct phase), they will exhibit a firing sequence as shown in row 2 of TABLE 1 in a four-stroke mode. If both processors assume incorrect first and second revolutions, they are both out of phase as shown in row 3 of Table 1.

Figure 6A:
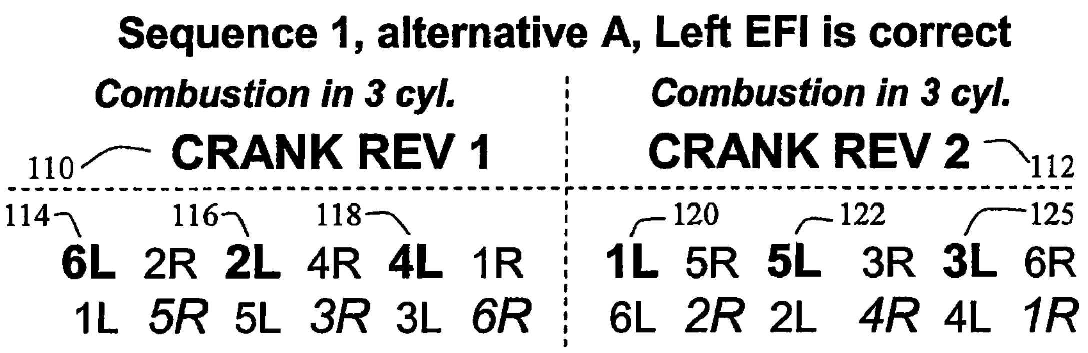
FIG. 6 shows a diagram illustrating a manipulation of a V12 engine firing sequence that may be implemented to determine engine phase according to one embodiment of the subject invention.
Figure 6B:
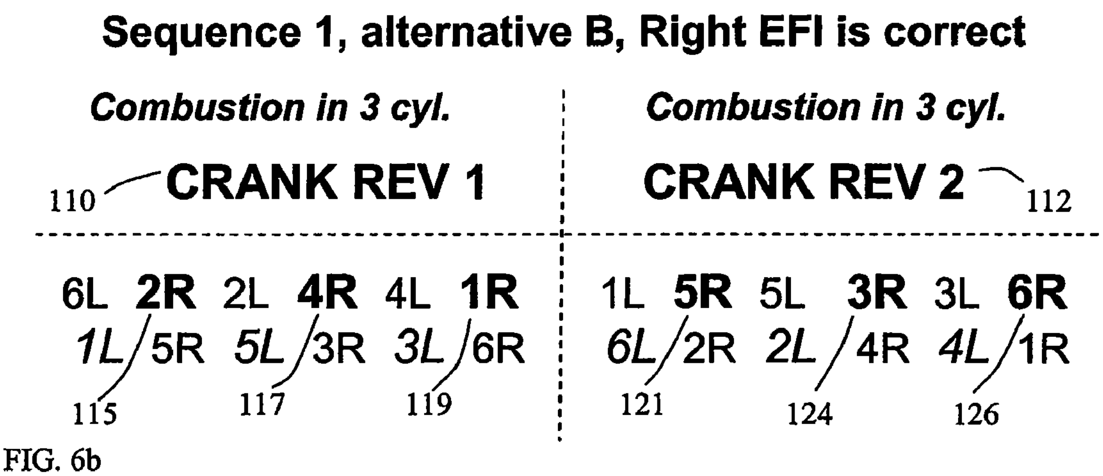

According to one embodiment of the subject invention, the phase of the left processor 310 on the right processor 320 is intentionally shifted 360° with respect to the other, which results in the solenoid action as shown in FIGS. 6A and B. See also rows 4–7 of Table 1. This is referred to as the phase shifted 4-stroke mode. The 360° phase shift results in a manipulation where the injection command signals from either the left processor 310 or the right processor 320 will be in the correct phase, and the other being out of phase. FIG. 6A shows the firing sequence and solenoid activation of the cylinders when the left processor 310 is in the correct phase. As will be discussed further below, the bolded cylinders represent solenoid activation and fuel injection so as to cause combustion in the cylinder (firing) and the italicized cylinders represent solenoid activation but no fuel injection (no combustion occurs), and the plain black (no bold or italics) cylinders represent no solenoid activation. FIG. 6B shows the firing sequence if the right processor 320 is in the correct phase. If the left processor 310 is in the correct phase then the sixth cylinder 114, the second cylinder 116, the fourth cylinder 118, the first cylinder 120, the fifth cylinder 122 and the third cylinder 125 on the left bank will be firing. Conversely, if the right processor 320 is in the correct phase, the second cylinder 115, the fourth cylinder 117, the first cylinder 119, the fifth cylinder 121, the third cylinder 124, and the sixth cylinder 126, all of the right bank will be firing. Based on this assumption, determining whether the left processor 310 or the right processor 320 are in the correct phase is enabled according to one embodiment by measuring engine speed when either the left processor 310 or the right processor 320 is brought back into phase with one or the other, i.e., same-phase.

TABLE 1

| | Crankshaft position | | | | | | | | | | | |
|---|---|---|---|---|---|---|---|---|---|---|---|---|
| | 0 | 75 | 120 | 195 | 240 | 315 | 360 | 435 | 480 | 555 | 600 | 675 |
| Correct TDC | 6L | 2R | 2L | 4R | 4L | 1R | 1L | 5R | 5L | 3R | 3L | 6R |
| Incorrect TDC | 1L | 5R | 5L | 3R | 3L | 6R | 6L | 2R | 2L | 4R | 4L | 1R |
| Left bank in correct phase | 6L | | 2L | | 4L | | 1L | | 5L | | 3L | |
| Left bank in incorrect phase | 1L | | 5L | | 3L | | 6L | | 2L | | 4L | |
| Right bank in correct phase | | 2R | | 4R | | 1R | | 5R | | 3R | | 6R |
| Right bank in incorrect phase | | 5R | | 3R | | 6R | | 2R | | 4R | | 1R |

Figure 7:
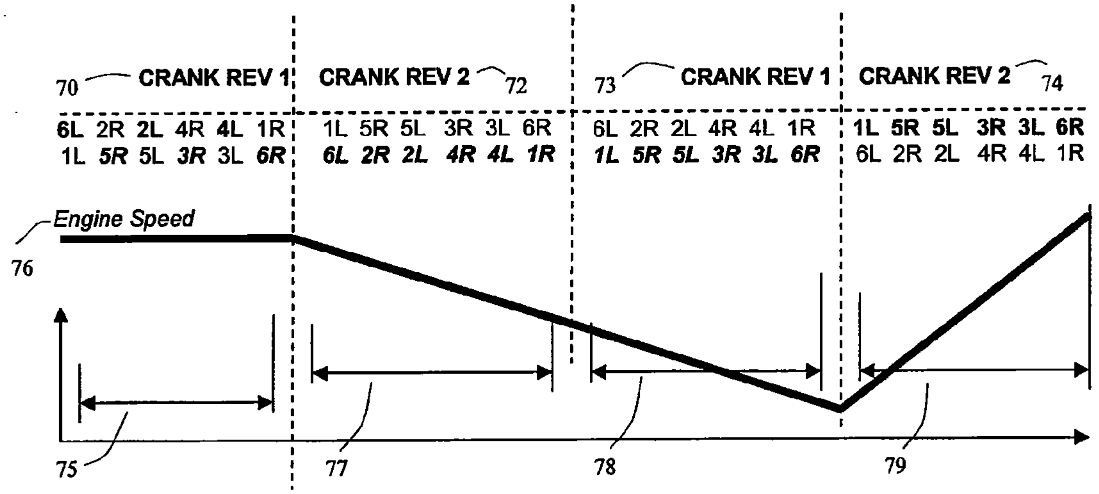
FIG. 7 shows a diagram demonstrating the determination of engine phase according to the manipulation embodiment shown in FIG. 6 and monitoring engine speed.

FIG. 7 demonstrates one embodiment of how the right and left processors 320 and 310, respectively, may be synchronized. In this scenario, the engine is started up 70 with the left processor 310 and right processor 320 out of phase with one another, phase shifted 4-stroke mode, with the left processor 310 being in the correct phase and the right processor 320 being at the incorrect phase. Engine speed is calculated for the first crank revolution measurement window 75. After the next crank revolution 72, the left processor 310 is brought into the same phase as the right processor 320. Bringing the left processor 310 in phase with the right processor 320 puts both processors out of phase with the correct engine phase, and as a result the engine speed decreases, as shown in measurement windows 77 and 78. The decrease in engine speed indicates that both processors 310 and 320 are out of phase. Based on this indicator, the processors 310 and 320 are both shifted 360° for the next crank revolution 74 to put them both in the correct engine phase, thereby causing all twelve cylinders to be in the proper firing sequence, or phase. Consequently, engine speed increases as shown in measurement window 79.

Figure 8:
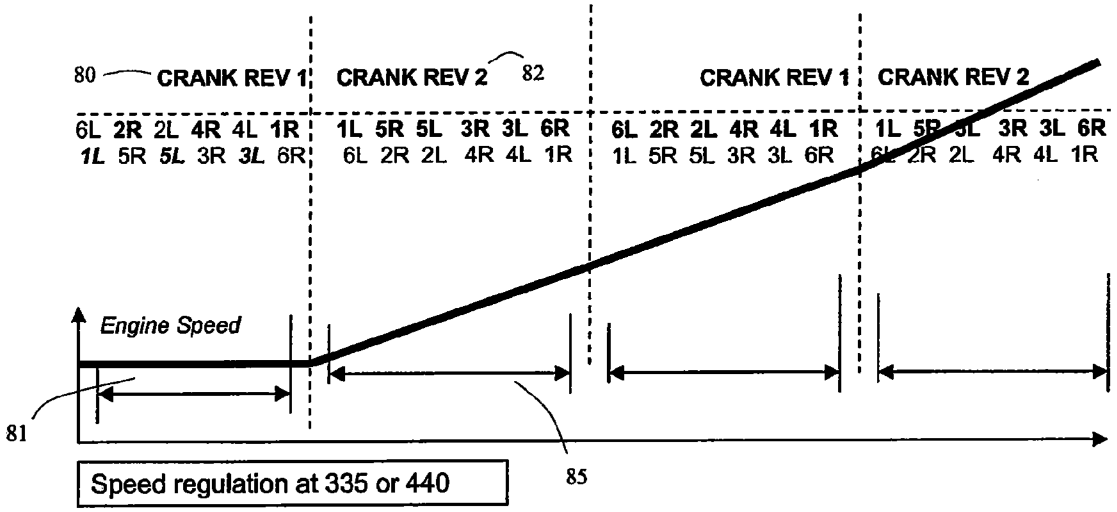
FIG. 8 shows a diagram demonstrating the determination of engine phase according to the manipulation embodiment shown in FIG. 6 and monitoring engine speed.

FIG. 8 illustrates the synchronization method embodiment similar to that shown in FIG. 7, but where the right processor 320 is in correct phase as the engine is cranked up 80. During the first crank revolution 80, the left and right processors 310 and 320 are out of phase with one another and engine speed is calculated 81. At the second crank revolution 82 the left processor 310 is brought into the same phase as the right processor 320 and engine speed is calculated 85. Because the left processor 310 and the right processor 320 are in the same and correct phase, the engine speed increases. This increase in engine speed indicates that both processors 310, 320 are in the correct phase, and normal operation commences.

Figure 9:
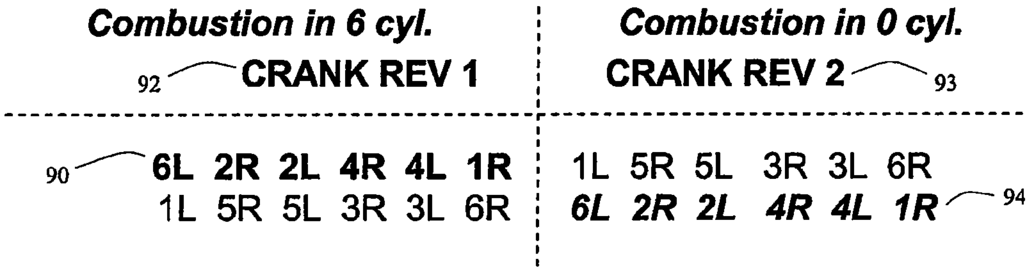
FIG. 9 shows a diagram illustrating a manipulation of a V12 engine firing sequence that may be implemented to determine engine phase according to another embodiment of the subject invention.
Figure 10A:
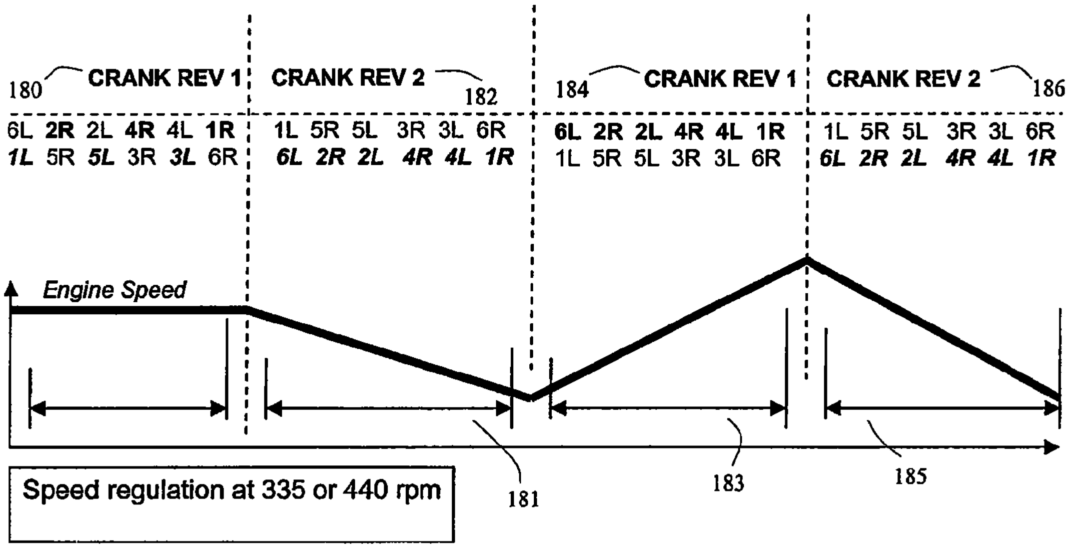
FIG. 10*a*–*b* shows a diagram demonstrating the determination of engine phase according to the manipulation embodiment shown in FIG. 9 and monitoring engine speed.
Figure 10B:
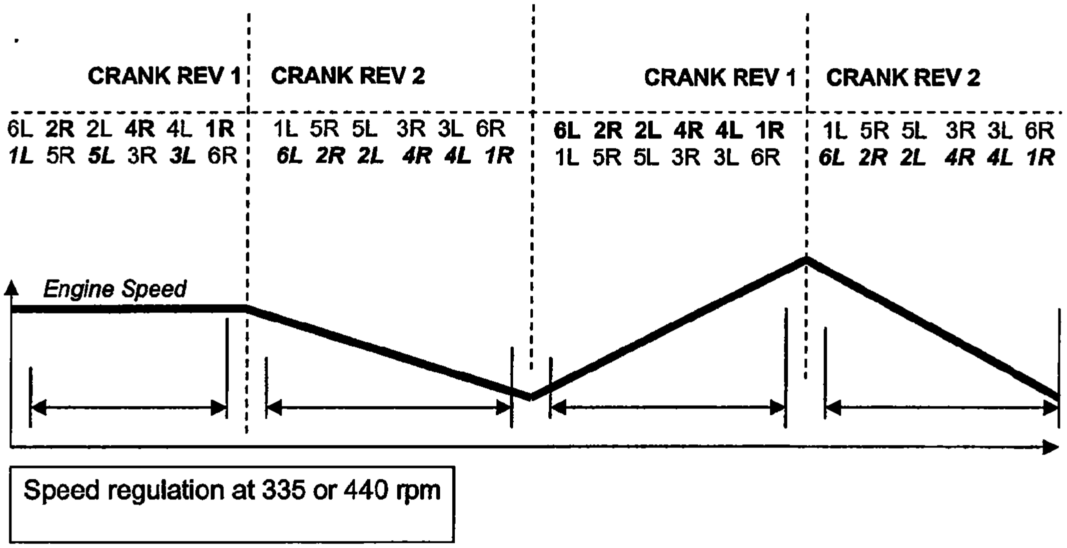

According to another embodiment, the left processor 310 and the right processor 320 are programmed to activate the solenoid on the same three cylinders on every revolution. This is referred to as the semi two-stroke mode. See FIG. 9. During the first crank revolution 92, fuel injection command signals are sent to the first three cylinders of the left and right banks shown as 90. During the second crank revolution 93, fuel injection command signals are sent to the same six cylinders 94. FIG. 10A represents a schematic that implements the semi two-stroke mode in synchronizing the phase of the left processor 310 and the right processor 320. At crank revolution 180, the engine is put in a phase shifted four-stroke mode with the left processor 310 and the right processor 320 shifted in phase by 360°. Upon the second crank revolution 182, both the left processor 310 and the right processor 320 are changed to the semi two-stroke mode as described in FIG. 9. For the initial crankshaft revolution 180, the right processor 320 was in the correct phase (see bolded cylinders). Thus, when the processors 310 and 320 are converted to the semi two-stroke mode in the second crank revolution 182, no cylinders fire during the second crank revolution, thereby causing a decrease in speed 181. The left and right processors 310 and 320 remain in the semi two-stroke mode for the next two revolutions 184 and 186. During crank revolution 184, all six cylinders fire in the proper sequence and engine speed increases, measurement window 183. Conversely, in the next successive revolution 186, the cylinders are out of phase and do not fire. As a result, engine speed decreases, measurement window 185. Based on the increase and decrease of engine speed in the semi two-stroke mode, the proper phase can be determined. The left and right processors 310 and 320 are configured to assure the proper phase is switched to normal four-stroke mode, and normal operation commences. FIG. 10B is a similar demonstration of that shown in FIG. 10A, except that the left processor 310 is in the proper phase at start up.

Figure 11A:
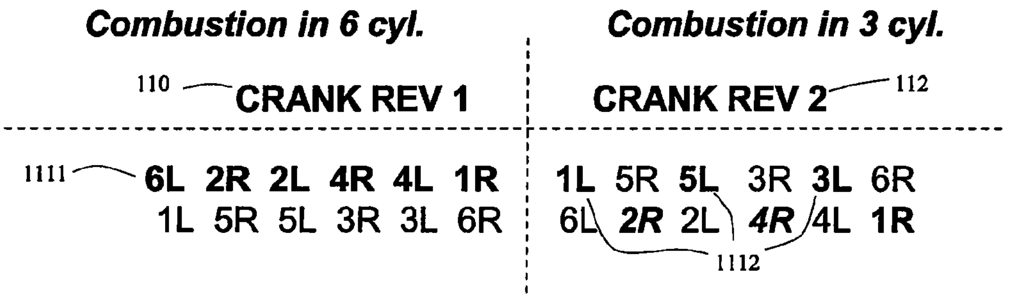
FIG. 11*a*–*b* shows a diagram illustrating a manipulation of a V12 engine firing sequence that may be implemented to determine engine phase according to another embodiment of the subject invention.
Figure 11B:
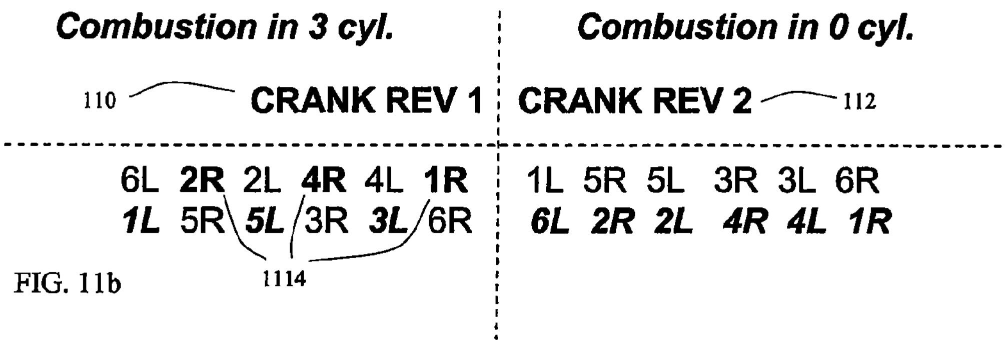

FIGS. 11A and B show another method of manipulating the firing sequence of cylinders for purposes of determining the proper engine phase. The manipulation method shown in FIGS. 11A and B involve directing the left bank of cylinders to assume normal four-stroke mode and the right bank of cylinders to assume the semi two-stroke mode, as described in FIGS. 6 and 9, respectively. It should be noted that the modalities assigned to the left processor and right processor could be reversed, e.g., left processor directed to conduct the semi two-stroke mode and the right processor directed to conduct the four-stroke mode. This is referred to as the partial semi-2-stroke mode. FIG. 11A shows the firing of cylinders when the left processor is in phase. During the first crank revolution 110 all six cylinders fire during their power stroke, see bolded cylinders 1111. During the second crank revolution 112 only the cylinders controlled by the left processor fire during their normal power stroke. See bolded cylinders 1112. Thus, if the left processor is in phase there will be a cycling of six cylinders firing and three cylinders firing in successive crank revolutions. This pattern will allow the proper engine phase to be deduced. FIG. 11B shows the firing of cylinders when the left processor is out of phase. During the first crank revolution 110, the second, fourth and first cylinders controlled by the right processor fire 1114. Because the left processor is out of phase and the second processor is in the two-stroke mode, no cylinders fire during the second crank revolution 112.

Figure 12A:
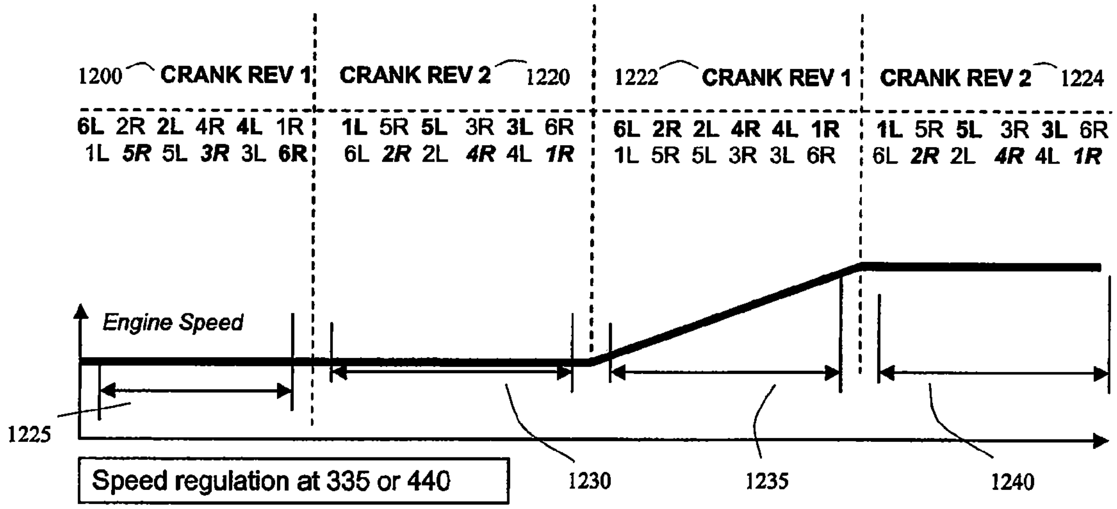
FIG. 12*a*–*b* shows a diagram demonstrating the determination of engine phase according to the manipulation embodiment shown in FIG. 11 and monitoring engine speed.
Figure 12B:
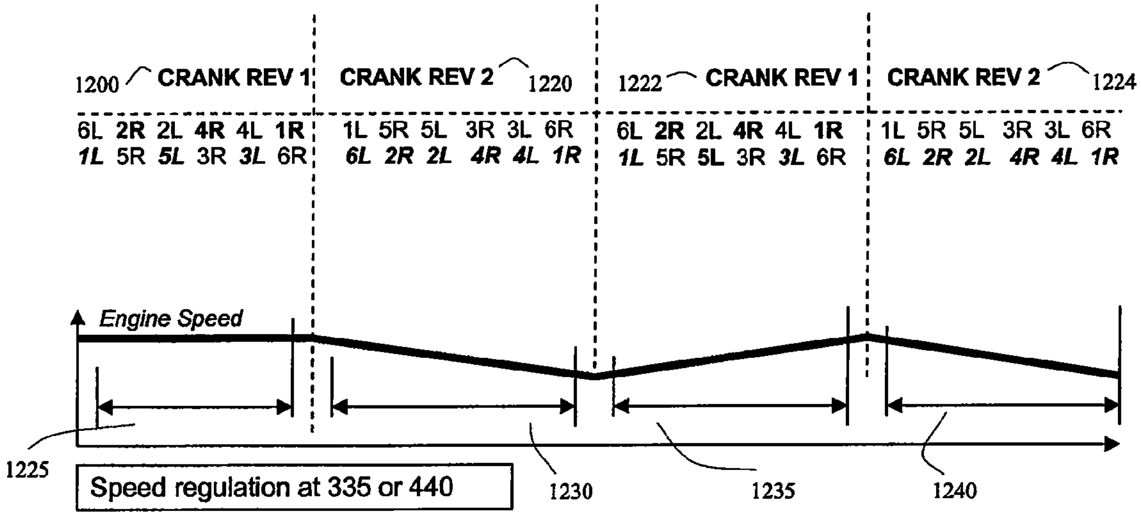

FIG. 12 demonstrates a synchronization method utilizing the modality illustrated in FIG. 11. At an initial crankshaft revolution, 1200, the engine is set to the phase-shifted 4-stroke mode. Once the second crank revolution starts 1220 the right processor is changed to semi two-stroke mode. Because the left processor remains in four stroke mode and is in the correct phase, combustion occurs in three cylinders during measurement windows 1225 and 1230. During the next successive crank revolution 1222, combustion occurs in six cylinders. Consequently, engine speed increases, see measurement window 1235. In the next revolution 1224 only three cylinders controlled by the left processor experience combustion. Thus engine speed does not increase, measurement window 1240. FIG. 12B shows a synchronization method utilizing the manipulation illustrated in FIG. 1. In FIG. 12B, the scenario is shown where the left processor is out of phase but the right processor is in phase. During the first crank revolution 1200, the left and right processors start up in phase shifted four-stroke mode. At the initiation of the second crank revolution 1220, the right processor is changed to semi two-stroke mode. During the second revolution 1220, no combustion occurs in any of the cylinders which results in a decrease in engine speed, see measurement window 1230 compared to 1225. During the next successive revolution 1222, combustion occurs in three cylinders controlled by the right processor and engine speed increases slightly. See measurement 1235. On the next revolution 1224, combustion occurs in none of the cylinders and engine speed decreases. See measurement window 1240. FIGS. 12A and B illustrate that by utilizing the manipulation shown in FIG. 11, a signature of engine speed increase and decrease can be detected. This increase and decrease in engine speed signature enables the determination of the proper engine phase. Once engine phase is determined, the out of phase processor is corrected, and both processors are switched to normal four-stroke mode.

Figure 13:
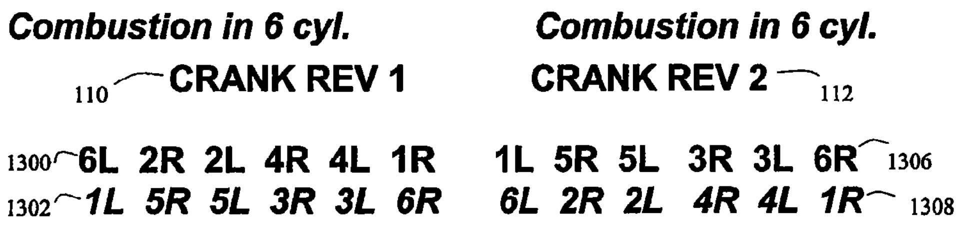
FIG. 13 shows a diagram illustrating a manipulation of a V12 engine firing sequence that may be implemented to determine engine phase according to another embodiment of the subject invention.

FIG. 13 illustrates another manipulation method embodiment of the firing sequence of a left and right bank of cylinders. According to this manipulation, injection of fuel is commanded in all twelve cylinders during every TDC position of each cylinder. This is referred to as the true two-stroke mode. This manipulation results in combustion in six cylinders during the first crank revolution 110 and the second crank revolution 112. During the first crank revolution 110, cylinders shown as 1300 fire while as cylinders 1302 receive a command to injection fuel but due to the mechanical constraints, no fuel is injected into the cylinders. During the second crank revolution 112, cylinders 1306 fire while a command to inject fuel in cylinders 1308 occurs, no fuel is injected into the cylinders 1308.

FIG. 14 shows a synchronization method implementing the manipulation shown in FIG. 13. During the first crank revolution 1400, both the left and right processors are commanded to direct firing in the true two-stroke mode. Thus, combustion occurs in six cylinders during measurement window 1245. Because combustion occurs in six cylinders during both crank revolutions in the true two-stroke mode, monitoring engine speed during the two-stroke mode will not show an increase and decrease in engine speed. Thus another manipulation must be utilized during synchronization. For this example, the first and second processors 310, 320 are set to the full semi-2-stroke mode. Because the left and right processors fire in the first three cylinders for the second revolution 1410 engine speed decreases, as shown in measurement window 1430. During the next revolution 1415, combustion occurs in six cylinders and engine speed increases. See measurement window 1435. Engine speed decreases during the next revolution 1420 as shown in measurement window 1440. This increase and decrease of engine speed allows for the determination of engine phase. If one of the processors is out of phase, it is then set to the proper phase and both processors are directed to assume the normal four-stroke mode.

Referring back to FIG. 5, in a specific embodiment, a signal processor comprises at least one processing module configured to generate a crank signal from at least one crank sensor, not shown, and at least one processing module 330 configured to generate a simulated cam signal 332. The simulated cam signal is typically a signal that is generated at the start of each crank shaft revolution. In a V12 example, the left processor 310 and the right processor 320 are configured to control the firing sequence of the fuel injection. Accordingly, in a typical embodiment, the different manipulation modes as described in FIGS. 6, 9, 11 and 13, resides on the left and right processors 310, 320. Which manipulation (modality) the left and right processors 310, 320 will perform is directed by the master processor 340. The table shown in FIG. 15 shows an example of message units used to develop a message frame that is sent from the master processor 340 to the left and/or right processors 310, 320. FIG. 16 shows a table of message units that are used to develop a message frame from the left and/or right processors 310, 320 to the master processor 340. In FIG. 17, a number of functions are shown based on the settings in FIGS. 15 and 16, which control the synchronization of the engine. Attention is drawn to the function 1700, which is the function that controls which modality each processor will assume (four-stroke mode, semi two-stroke mode, true two-stroke mode) and which revolution each processor will assume to be the first revolution. It is important that the left processor 310, the right processor 320, and the master processor 340 have the same understanding about which revolution of the crankshaft is the first revolution and which revolution is the second revolution. To mark the revolutions, the signal processor 330 generates a signal at the initiation of each revolution, referred to as the simulated cam signal 332. The simulated cam signal 332 comprises a series of high and low square waves. By convention, the high signals are designated as odd and the low signals are designated as even. At engine start up, the engine controller unit 300 cannot determine which revolution is the first revolution in the firing sequence. Thus, using the definition of functions 1700, the left and and right processors 310, 320 may be set to a particular manipulation mode to determine proper engine phase and synchronize the engine as described above. For example, in executing the phase-shifted 4-stroke mode where the left and right processors are out of phase with each other, the following message frame is constructed:

by default, the settings start out as follows:

EFI=Zero
mode=zero
first revolution=zero;

to switch the left processor out of phase, the following settings are executed:

EFI=1
mode=zero
first revolution=1.

FIGS. 15–17 represent just one example of the message language that can be implemented. The program language used is not critical, so long as the program language can enable the desired functionality. FIG. 18 represents a table showing files and functions in the master processor 340 according to a typical embodiment of the subject invention. Table 19 represents a table showing files and functions in each of the left and right fuel injection control processors 310, 320, according to a typical embodiment of the subject invention.

According to another aspect, the subject invention relates to an apparatus and method for measuring acceleration corresponding to individual cylinders of an engine during engine operation. Many engine parameters like fuel injection components and dimensions and quality of fuel spray and the like can cause changes in combustion quality from cylinder to cylinder, as well as over the life of an engine for a particular cylinder These differences can lead to deterioration in engine performance, fuel consumption, and emission levels. Knowing the acceleration of the crankshaft at time intervals corresponding to each cylinder enables the extrapolation of important engine events and performance, such as but not limited to, optimization of fuel injection timing and fuel injection quality. In addition, knowing crankshaft acceleration for a given time window is one method for synchronizing fuel injection by a control processor without the need of a cam sensor. In a basic embodiment, crankshaft acceleration is determined by measuring the rotational acceleration of a rotating member such as a crankwheel that comprises a plurality of elements spaced about the crankwheel. One or more crank positioning sensors positioned proximate to the crankwheel generates positioning signals based on the passage of said elements by the crank positioning sensors. A processor unit is communicatingly connected to said one or more crank positioning sensors and is configured to measure a time period window of rotation of the crankshaft. Preferably, the unit is configured to measure rotational windows of time corresponding to each cylinder of the engine. The time period occurring for the passage of two elements by the crank positioning sensor, or the time period of the passage of a predefined number of elements by the crank positioning sensor, provides data points that allow for the calculation of a cylinder that is misfiring or otherwise is experiencing performance problems. The time between elements on the crankwheel corresponding to the TDC position of a particular cylinder experiencing problems will increase.

As mentioned above, crankshaft acceleration information can be used to monitor individual cylinder performance, and correct performance problems by increasing or decreasing fuel quality or timing of fuel injection. In one embodiment, the subject invention is directed to an engine controller unit configured to collect crankshaft acceleration information and calculate individual cylinder performance in comparison to other individual cylinders or all the cylinders as a whole. In a specific embodiment, engine controller unit is configured to generate a combustion quality index. This combustion quality index is a number between 1 and 100 and is calculated from an average of ten similar engine type operations in an engine test and is the weighted average of the element-to-element pulse count from the start of injection time to 40° crankwheel rotation after that, which is then divided by the average calculated pulse count calculated from the average engine speed measured for one complete revolution and converted as a percentage. This number may be normalized by exhaust temperature data for that cylinder bank and also further corrected by intake manifold air pressure. The difference between a stored value of combustion quality index for a particular cylinder and the actual measured index indicates any deviations in combustion quality. This may then be used to calculate the proportion of the fuel quantity that must be increased or decreased for each of the cylinders in order to bring the performance of that particular cylinder in line with that of the other cylinders. Preferred conditions for collecting combustion data are as follows:

(a) engine water temperature stable for a 120 to 180 seconds and above 100° F.;

(b) engine speed stable for 120–180 seconds and above 440 rpm's;

(c) engine fuel quantity stable for 120–180 seconds and above 100 $mm^3$/stroke; and (d) engine oil temperature stable for 120–180 seconds and above 100° F.

Furthermore, the difference between the stored value of combustion quality index and the actual measured index indicates the deviation in combustion quality. Generally, if the deviation is more than a predefined percentage (e.g., more than 2 to 20%) then that cylinder is indicated as one having misfired.

Figure 20:
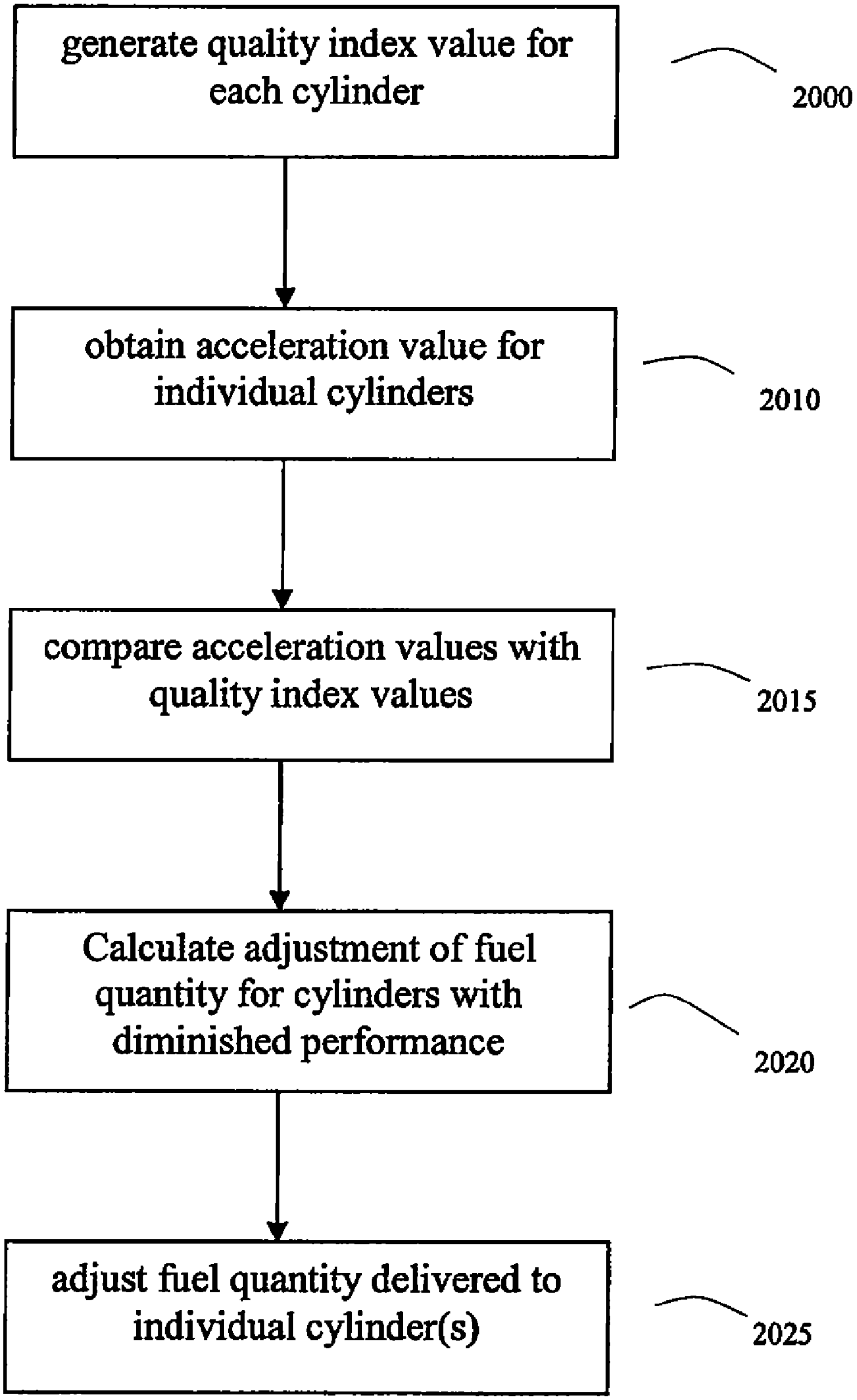
FIG. 20 represents a flow diagram showing one embodiment of the invention for optimizing fuel delivery to individual cylinders.

FIG. 20 shows one method embodiment of optimizing cylinder performance. According to this method embodiment, a quality index value for each of the cylinders is generated by acquiring and processing various parameter data 2000. Once a quality index value is generated, an acceleration value is determined for a specific cylinder 2010. The acceleration value is compared with the quality index value 2015. Based on the differences realized from step 2015, a proper adjustment of fuel quantity is calculated 2020. Based on the calculation performed during 2020, fuel quantity to individual cylinders is adjusted 2025.

Figure 21:
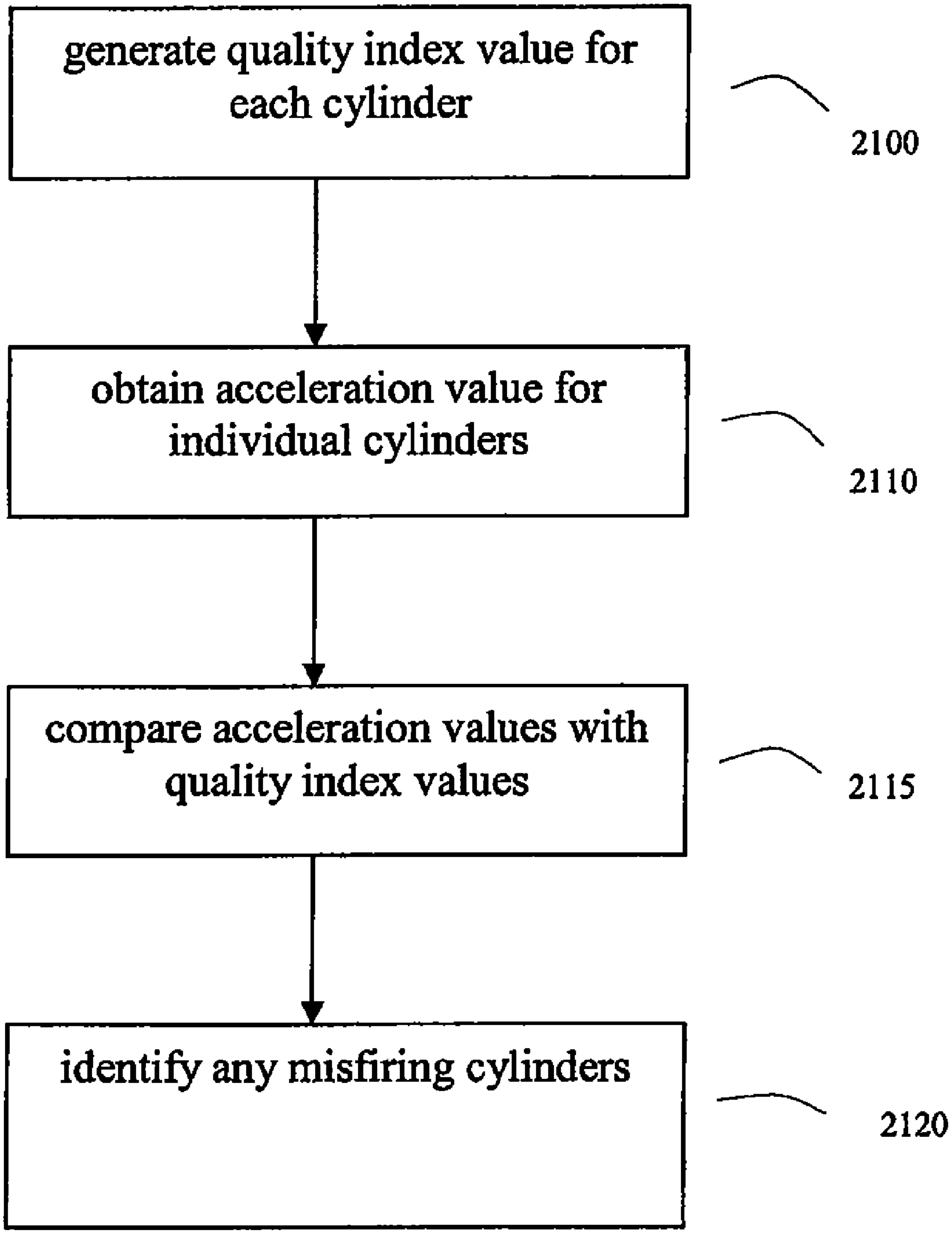
FIG. 21 is a flow diagram representing one embodiment of the subject invention for identifying misfiring of cylinders.

In another embodiment, cylinder acceleration is used to identify whether any cylinders of an internal combustion engine are misfiring. Referred to the flow diagram in FIG. 21, a quality index value for each cylinder is generated 2100. An acceleration value for an individual cylinder is obtained 2110. The acceleration value is compared with the quality index value 2115. Based on this comparison, any misfiring cylinders may be identified 2120.

As discussed above, observing cyclic acceleration of the crankshaft provides an exceptionally high resolution of conditions of individual cylinders. Due to this high resolution, crankshaft acceleration may be used as the engine indicator for method embodiments of determining engine phase as described above. The description of the methods illustrated in FIGS. 7, 8, 10, 12 and 14 require the monitoring of some indicator to observe changes of that engine indicator brought about by manipulating the modality of the left and right processors. The engine indicator exemplified in the description of the aforementioned figures is engine speed. However, each of the synchronization methods have certain advantages and certain limitations. For example, the four-stroke synchronization method described in FIGS. 7 and 8 is difficult to perform during transition of the engine up to its normal operating speed. However, the four-stroke synchronization method allows for a smooth start up. Utilizing cylinder acceleration as the engine indicator will provide the necessary information to perform the four-stroke synchronization method embodiment, even while the engine is in transition. Stated differently, observing cylinder acceleration for each cylinder will provide the user information regarding which cylinders are firing and which cylinders are not firing. This information then enables the deduction of which processor is in phase, in view of predefined manipulations of the injection sequence directed by the left and right processors.

Figure 22A:
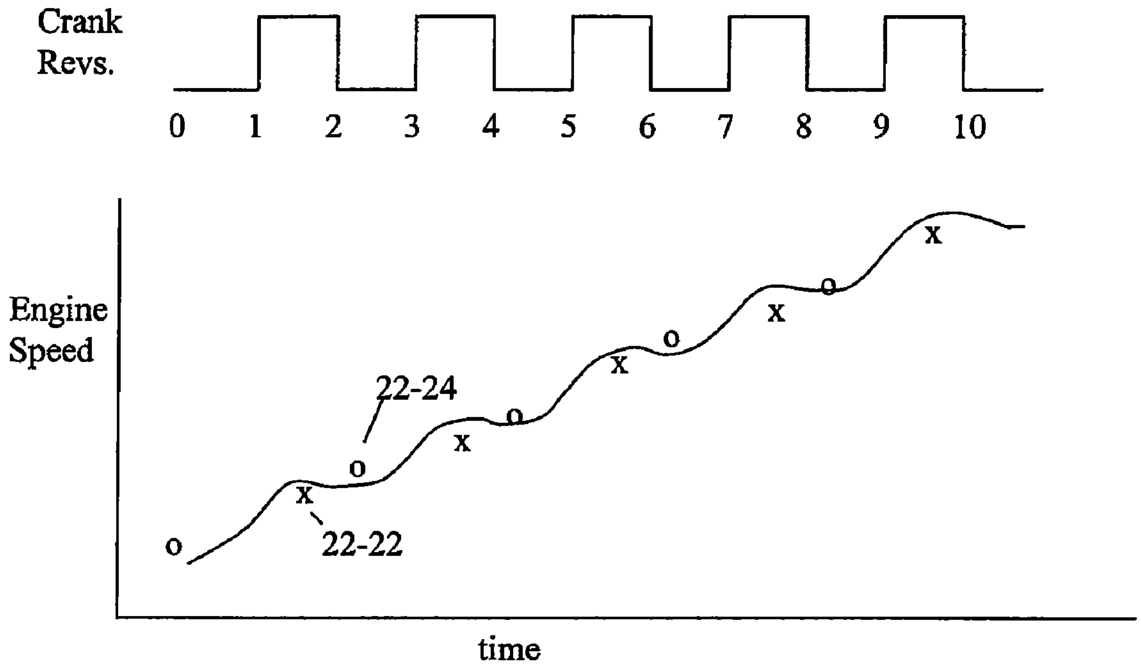
FIG. 22*a*–*b* show graphs of embodiments for calculating engine speed while operating in a modality embodiment taught herein and during engine transition.
Figure 22B:
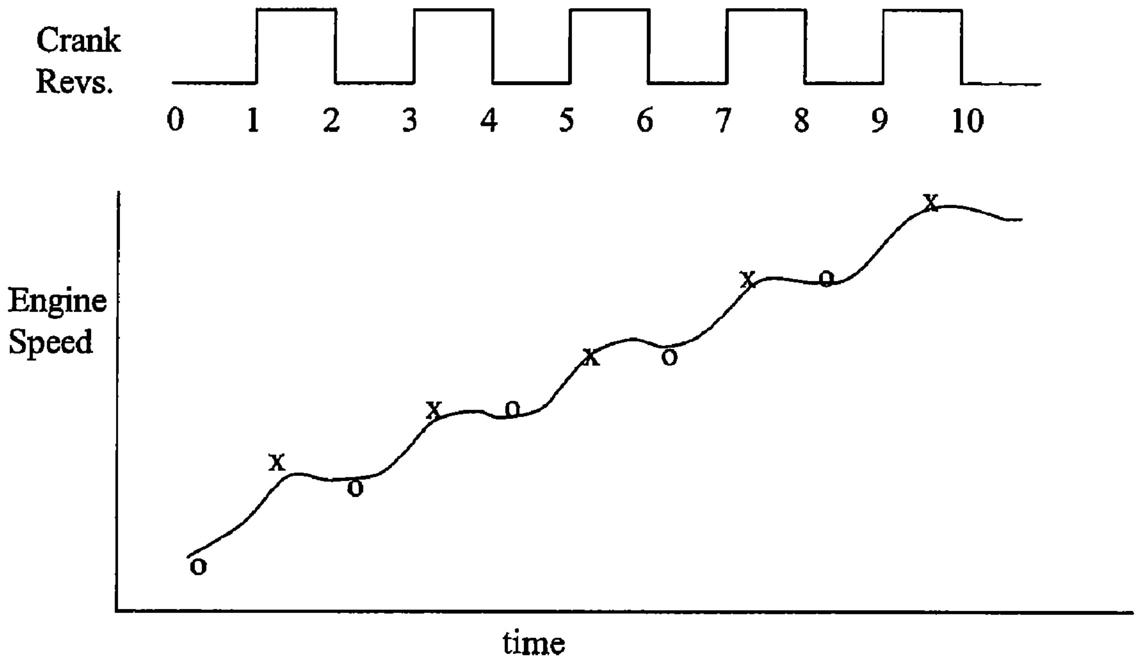

In some circumstances, engine speed may be used as an indicator to determine engine phase even during transition of the engine. Using engine speed as the indicator during transition typically requires implementing the full semi two-stroke modality, as the alternating engine speed allows for a recognizable signature even through the engine is ramping up, i.e., accelerating to a predefined engine speed. FIG. 22*a* represents a graph of engine speed of an engine set to full semi two-stroke mode while the engine is in transition. Engine speed of an odd revolution is indicated as the o's and engine speed of an even revolution is designated by the x's. The first x 22-22 represents the average of the engine speed at point 0 and point 1. The first circle 22-24 represents the average of engine speed at point 1 and point 2. By calculating consecutive 0's minus consecutive x's, the revolution producing engine speed may be determined. However, there are drawbacks to using the average speed over an entire revolution for this calculation. For example, in some cases, a line formed by connecting the solid circles and x's would be relatively flat. This flat signature would make the determination of the correct engine phase difficult. That is, (3 consecutive o's)−(3consecutive x's) is not greater than 0 all the time. FIG. 22*b* represents a modification of the calculated engine speed. In this figure, engine speed of the odd and even revolutions is represented as one engine speed value obtained at the initiation of each revolution. While this generates a sufficient high/low signature in order to determine correct engine phase, since only one data point of engine speed is obtained, noise can interfere with the determination. To address these noise issues, three samples at the end of each revolution are acquired, and then averaged to calculate engine speed for that revolution.

According to another embodiment, engine phase can be determined while engine is in transition using the average engine speed over consecutive revolutions. Engine startup occurs in full semi-2 stroke mode utilizing average speed in crank rev1 and crank rev2 (the odd/even designation can be assigned to each of these). Calculations are typically performed after engine reaches engine crank exit speed of 225 rpm and utilizing average speed in crank. Average Speed is calculated using the following equation $$AvgSpeed = \frac{Speed_t + Speed_{t-1} + Speed_{t-2}}{3}$$

Figure 23:
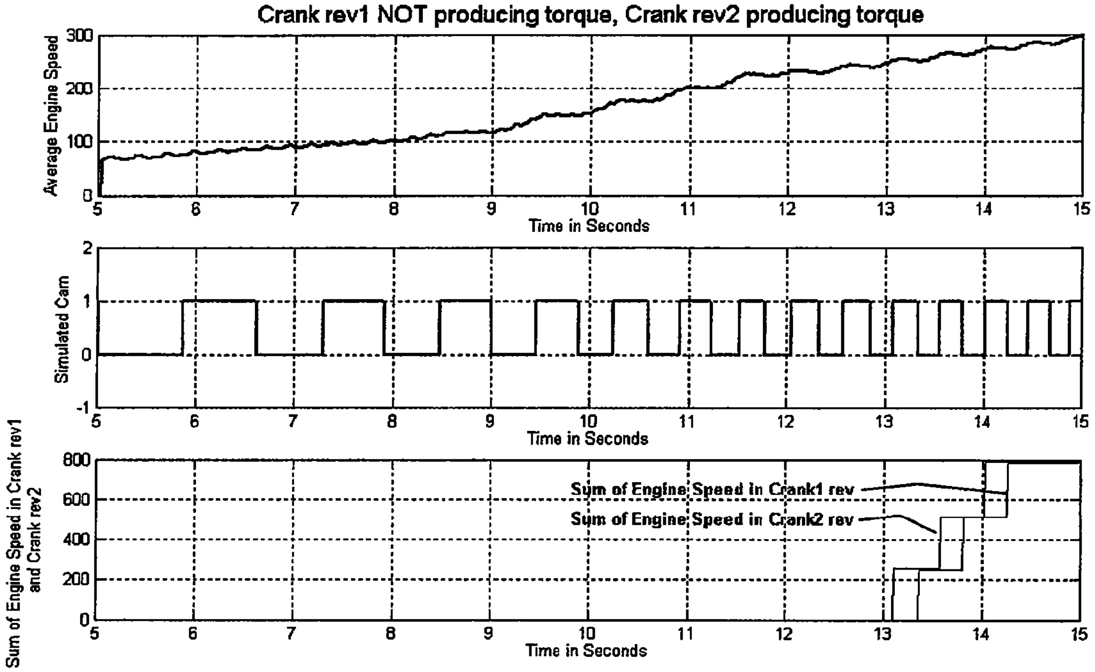
FIG. 23 shows an embodiment utilizing rolling averages of engine speed to determine engine phase.

FIG. 23 shows an implementation of this algorithm. In this case (sum of engine speed at end of 3 consecutive crank rev1)–(sum of engine speed at end of 3 consecution crank rev2)=(783.9–790.9)=–7.0 this means phase needs to be corrected by 360 degrees once switched to same phase 4-stroke mode.

According to another embodiment, engine phase may be determined during transition by utilizing engine acceleration in the crank rev1 and crank rev2 (the odd/even designation can be assigned to each of these). Engine startup occurs in full semi-2 stroke mode. Calculations typically are performed after engine reaches engine crank exit speed of 225 rpm. Average Speed is calculated using the following equation $$AvgSpeed = \frac{Speed_t + Speed_{t-1} + Speed_{t-2}}{3}$$

Average Acceleration is calculated by differentiating Average Engine Speed $$AvgAcc = \frac{\partial AvgSpd}{\partial t}$$

Figure 24:
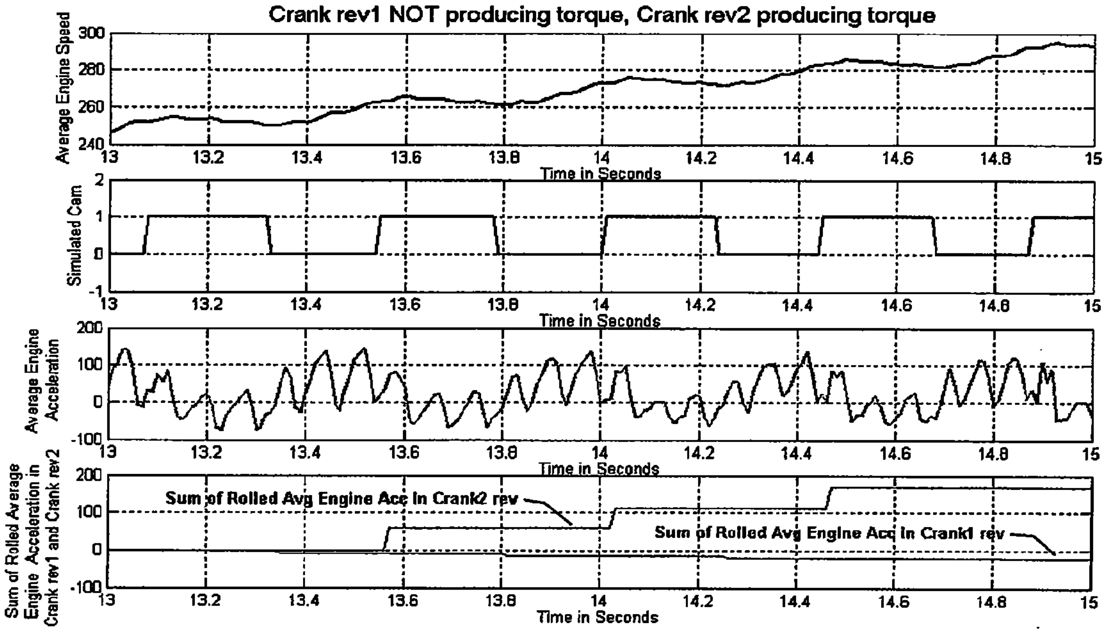
FIG. 24 shows an embodiment utilizing engine acceleration to determine engine phase.

Rolled Average Acceleration during each crank revolution is calculated using the following equation $$RolledAvgAcc = \sum_{i=1}^{i=N} \frac{AvgAcc_i}{N}$$

where i=1 is the first sample (start) of a Crank revolution and i=N is last sample (end) of a crank revolution Referring to FIG. 24, in this case the (sum of rolled average engine acc during 3 consecutive crank rev1 )–(sum of rolled average engine acc during 3 consecutive crank rev2)=(–22.47–168.1)=–190.57 this means phase needs to be corrected by 360 degrees once switched to same phase 4-stroke mode While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The embodiments may be adapted for many engine configurations including, but not limited to, straight 4, 6, 8, 12, and 16 cylinder engines and V4, V6, V8, and V16 engines.

The invention claimed is:

1. A method for determining the phase of a crankshaft of an internal combustion engine, said internal combustion engine comprising a plurality of cylinders whose firing sequence occurs over two revolutions of said crankshaft with a first set of cylinders whose power stroke occurs during a revolution of said crankshaft and a second set of cylinders whose power stroke occurs during a different revolution of said crankshaft, each cylinder configured to possess an injection window in which fuel is allowed to be injected, said method comprising:

generating a command signal to inject fuel into at least one cylinder from said first set of cylinders during an injection window;

generating a command signal to inject fuel into at least one cylinder said first set of cylinders at a time out of phase with said injection window;

monitoring an indicator of engine performance that is responsive to firing and non-firing of said cylinders; and deducing correct engine phase based on fluctuations in said engine indicator corresponding to said generating of fuel injection command signals during an injection window and said generating of fuel injection command signals out of phase with said injection window.

2. The method of claim 1, wherein said engine indicator is selected from the group consisting of engine speed, crankshaft acceleration, exhaust temperature, and mean fuel value.

3. The method of claim 1, wherein said engine is a V-type engine comprising a left bank of cylinders, half belonging to said first set and half belonging to said second set; and a right bank of cylinders, half belonging to said first set and half belonging to said second set, and wherein said firing sequence is controlled by an engine controller unit comprising a first processing module configured for directing fuel injection command signals for said left bank of cylinders, and a second processing module configured for directing fuel injection command signals for said right bank of cylinders, wherein at least one of said first and second processing modules is set to semi-2-stroke mode.

4. A method of evaluating individual cylinder performance in an internal combustion locomotive engine comprising a crankshaft operationally coupled to a plurality of pistons positioned in a plurality of cylinders, said method comprising:

(a) measuring a time period of a first rotational interval of said crankshaft corresponding to the expected combustion in a first cylinder to obtain a first acceleration measurement, (b) measuring a time period of a second rotational interval of said crankshaft corresponding to the expected combustion for at least three cylinders to obtain a second acceleration measurement, (c) equalizing said second acceleration measurement to correspond to a value representative of a rotational interval similar in length to said first rotational interval to obtain a equalized value; and (d) comparing said first acceleration measurement to said equalized value, wherein a difference between said first acceleration measurement and said equalized value indicates a difference in performance of said first cylinder in comparison to other cylinders of said engine.

5. The method of claim 4, wherein said crankshaft comprises a rotating member attached thereto that comprises a plurality of elements equidistantly spaced about said rotating member, and wherein said first rotational interval comprises a degree of rotation corresponding to the distance between two of said elements pass a point.

6. The method of claim 5 wherein said second rotational interval comprises a complete revolution of said rotating member.

7. The method of claim 5, wherein said equalizing comprises obtaining the average acceleration value for rotation intervals corresponding to the degree of rotation corresponding to the distance between two of said elements.

8. The method of claim 4 wherein said first measurement and said second measurement is obtained during an engine condition selected from the group consisting of a) engine water temperature stable for 120-10 second and above 100° F.; b: engine peed stable for 120–180 second and above 440 rpms; c) engine fuel quantity stable for 120–180 seconds and above 1 $mm^3$/stroke; d; engine oil temperature stable for 120–180 seconds and above 100° F.; and e) combinations of the foregoing.

9. A computer program product for use with a locomotive engine, said product comprising:

a computer usable medium comprising computer readable program mode modules embodied in said computer usable medium for determining the phase of the crankshaft of said engine, said engine comprising a plurality of cylinders whose firing sequence occurs over two revolutions of said crankshaft with a first set of cylinders whose power stroke occurs during a revolution of said crankshaft and a second set of cylinders whose power stroke occurs during a different revolution of said crankshaft, each cylinder configured to possess an injection window in which fuel is allowed to be injected;

a computer readable first program module for causing a computer to generate a command signal to inject fuel in at least one cylinder from either said first set or second set of cylinders during an injection window;

a computer readable second program code module for causing said computer to generate a command signal to inject fuel in at least one cylinder from either said first set or second set of cylinders at a time out of phase with said injection window; and a computer readable third program code module for causing said computer to determine which revolution corresponds to the firing of cylinders from said first set of cylinders based on an engine indicator that is responsive to firing and non-firing of said cylinders.

10. An engine controller unit configured for controlling the firing sequence of an internal combustion engine, said internal combustion engine comprising a plurality of cylinders whose firing sequence occurs over two revolutions of said crankshaft with a first set of cylinders whose power stroke occurs during a revolution of said crankshaft and a second set of cylinders whose power stroke occurs during a different revolution of said crankshaft, each cylinder configured to possess an injection window in which fuel is allowed to be injected, said engine controller unit comprising:

a first processing module configured to generate a command signal to inject fuel in at least one cylinder from either said first set or second set of cylinders during an injection window;

a second processing module configured to generate a command signal to inject fuel in at least one cylinder from either said first set or second set of cylinders at a time out of phase with said injection window; and a third processing module configured to determine which revolution corresponds to the firing of cylinders from said first set of cylinders based on an engine indicator that is responsive to firing and non-firing of said cylinders.

11. A system for determining correct engine phase of an internal combustion engine without the need for a cam sensor, wherein said internal combustion engine comprises a first set of cylinders whose power stroke occurs during a first revolution of said crankshaft, and a second set of cylinders whose power stroke occurs during a second revolution of said crankshaft, said system comprising an engine controller unit that receives a signal stream responsive to rotation of said crankshaft, wherein said engine controller unit is configured for controlling the firing sequence of said internal combustion engine and wherein said engine controller unit comprises i) a first processing module configured to crank said engine in a cranking mode selected from the group consisting of phase shifted four-stroke mode, full semi-2-stroke mode, partial semi-2-stroke mode, and full two-stroke mode;

ii) a second processing module configured to observe changes in an engine indicator responsive to firing of said cylinders;

iii) a third processing module configured for determining engine phase based on changes observed in said engine indicator and iv) a fourth processing module configured to adjust engine to proper engine phase.

12. The system of claim 11, wherein said engine indicator is at least one selected from the group consisting of engine speed, crankshaft acceleration, exhaust temperature, and mean fuel value.

13. The system of claim 12, wherein said engine controller unit further comprises a fifth processing module to direct said engine to a regulated speed.

14. The system of claim 12, wherein said cranking mode is full semi-2-stroke mode, engine indicator is engine speed, and observing said changes occurs during engine transition.

15. The system of claim 13, wherein said engine controller further comprises a sixth processing module configured to set said engine to a mode different than said cranking mode prior to engine phase being determined.

* * * * *